Dec. 16, 1952     J. R. URSCHEL ET AL     2,621,692
MUSHROOM TRIMMING MACHINE
Filed Sept. 30, 1949     4 Sheets-Sheet 3
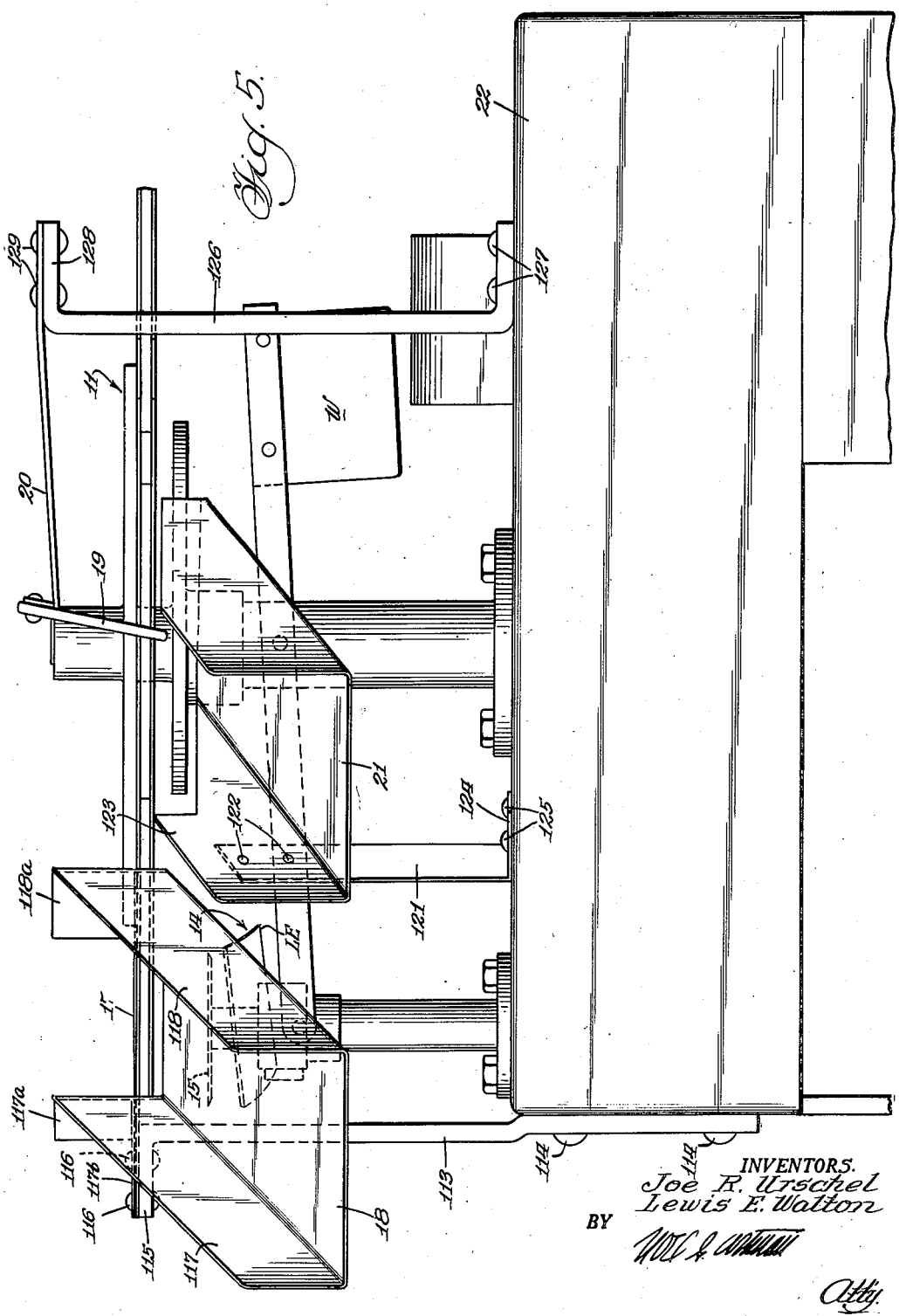
INVENTORS.
Joe R. Urschel
Lewis E. Walton
BY Dec. 16, 1952  J. R. URSCHEL ET AL  2,621,692
MUSHROOM TRIMMING MACHINE
Filed Sept. 30, 1949  4 Sheets-Sheet 4

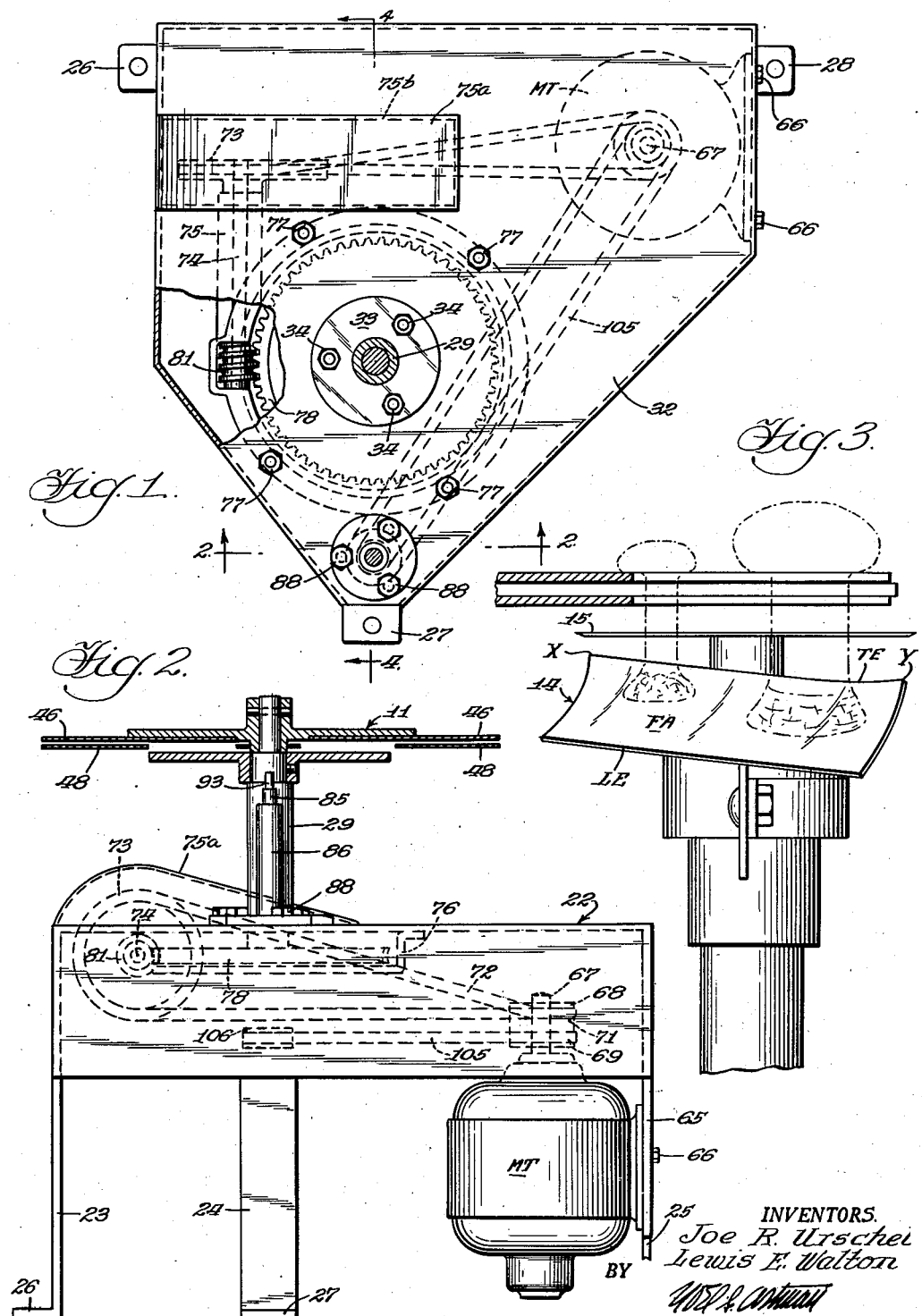

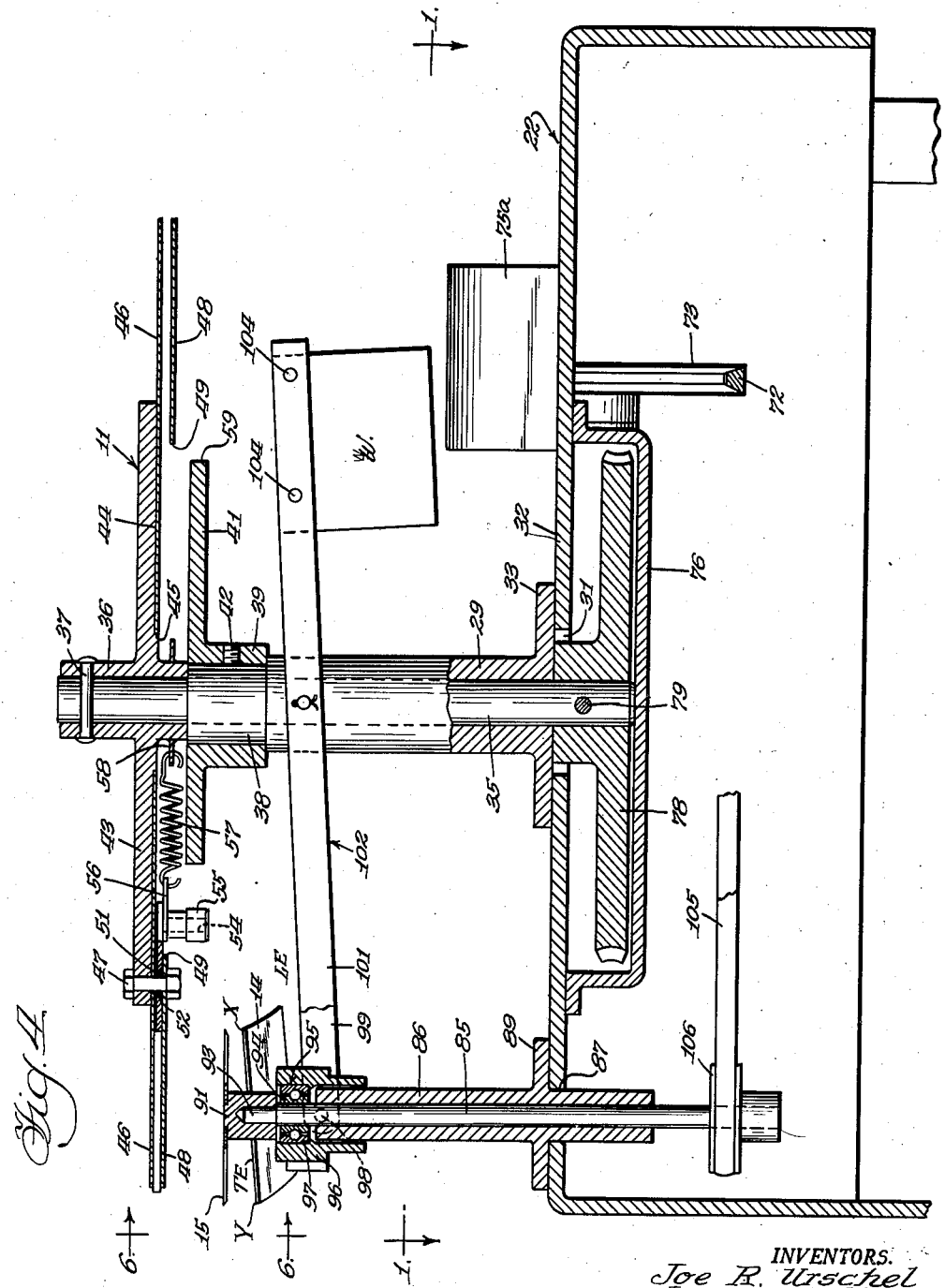

INVENTORS.
Joe R. Urschel
Lewis E. Walton
BY
Atty.

Patented Dec. 16, 1952

2,621,692

UNITED STATES PATENT OFFICE 2,621,692

MUSHROOM TRIMMING MACHINE

Joe R. Urschel, Valparaiso, Ind., and Lewis E. Walton, Niles, Mich.

Application September 30, 1949, Serial No. 118,818

12 Claims. (Cl. 146—81)

This invention has to do with apparatus for processing articles such as mushrooms having a stem portion and relates more particularly to apparatus operable to remove parts from one or more ends of the stem.

In the processing of mushrooms preparatory to their being canned, each is customarily severed into three parts respectively constituting the head or button of the mushroom, the stem proper, and the root portion at the lower end of the stem. The general object of this invention is the provision of apparatus adapted to perform these operations upon mushrooms after they have been fed individually thereinto.

A more specific object is the provision of article or mushroom holding means movable for transporting an article held thereby along a course for presenting the root end portion to a severing instrumentality which is thereby enabled to remove such root end portion while the stem continues in its movement.

A further object is the provision of a knife disposed adjacently to such course for also severing the head from the mushroom while the stem is transported therepast by the holding means.

Still another object is the provision of apparatus of the aforesaid character wherein the mushroom holding means and the root portion severing instrumentality or means are relatively movable endwise of a stem held by the holding means to determine the position along the stem where it is severed pursuant to removing the root end portion.

Normally the length of the root portion desired removed from a mushroom stem is a direct function of the diameter of the stem and it is a further object of the invention to provide a gauge means associated with the article or mushroom holding means for positioning the stem transversely of the course through which it is transported in accordance with the diameter of the stem and to provide a complemental gauge means sensitive to such transverse positioning of the stem for predetermining the relative position of the holding means and severing means whereby the length of the root end portion removed from the mushroom will be a function of the diameter of its stem.

Another object is the provision of mushroom trimming apparatus having a section along the path through which the mushrooms are successively transported for severing the root end portion and thus separating it from the stem and also having a section along said course where the head of the mushroom is severed and separated from the stem and a section where the stem is discharged from the holding means whereby these three components of the mushrooms are segregated into respective groups.

These and other desirable objects inherent in and encompassed by the invention will become readily comprehendible from the ensuing description, the appended claims, and the annexed drawings, wherein:

Fig. 1 is a horizontal sectional view taken from immediately above the base of the machine substantially at the plane designated 1—1 in Fig. 4, there being a section of the upper side of the base broken away for exposing part of the driving gear for a rotatable carrier of the apparatus.

Fig. 2 is an elevational view of the base portion of the machine taken in the direction of the arrows on the line 2—2 of Fig. 1, but containing a diametric section through the carrier or turret.

Figure 6:
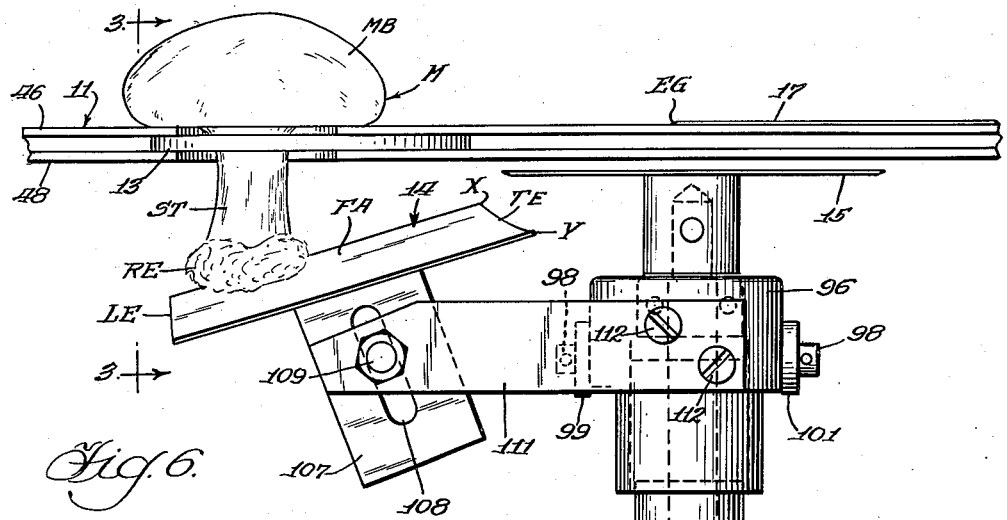

Fig. 3 is a fragmentary view taken substantially on the line 3—3 of Fig. 6 for showing the relation of an article holding means, the turret, a severing instrumentality or means in the form of a rotatable disc knife and a gauge member constrained for movement with the severing means and abuttable by the root portion of a mushroom held by the holding means for effecting relative movement of the holding means and severing means to determine the length of the root portion severed from the mushroom stem, there being typical mushrooms having different diameter stems illustrated at the position such mushrooms would be disposed in the holding means, and the view further illustrating the diagonal relation of the gauge face of the gauge member with respect to the severing means to cause a greater length of root portion to be cut from the large diameter stem than from the small diameter stem.

Fig. 4 is a vertical sectional view of the apparatus taken diametrically through the rotatable carrier and substantially at the plane indicated by the line 4—4 in Fig. 1.

Figure 7:
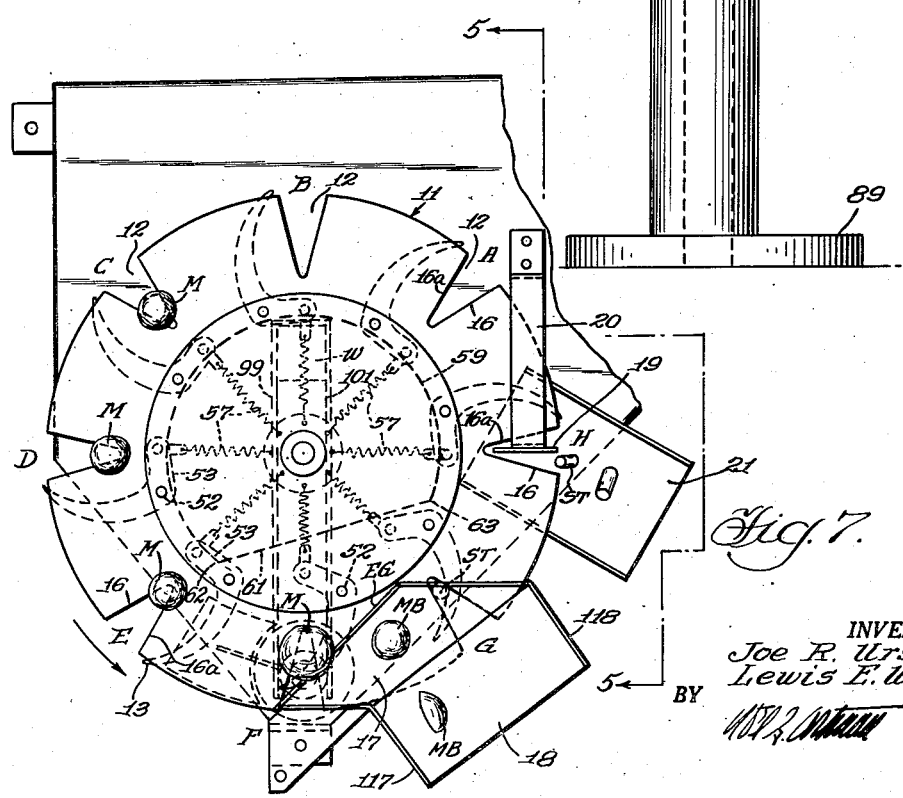

Fig. 5 is a side elevational view of the machine taken at the side indicated by the dot-dash line and associated arrows in Fig. 7, illustrating spouts for respectively receiving the button and stem portions of the mushrooms after the buttons have been cut from the stems and as the stems are discharged from the holding means therefor carried by the turret.

Fig. 6 is an elevational view showing a fragment of the turret carrier for the mushroom holding means, together with the root portion severing means and the gauge member slidably engageable by the root portion of a mushroom for predeterminedly locating the section of the stem at which the root portion is to be removed.

Fig. 7 is a fragmentary plan view taken from above the mushroom holding means carrier or turret.

Attention is now invited to Figs. 3, 4, and 7, from which a preliminary understanding of the operation of the machine can be gained. A rotatable carrier or turret 11 having a V-shaped article receiving notches 12 in its periphery is rotatable about a vertical axis at its center. The stems of mushrooms M to be operated upon by the apparatus are insertable into these notches with their heads or buttons uppermost and resting against the upper surface of the carrier. These mushrooms are insertable while the holding means notches 12 occupy any position between positions A—E. Rotation of the carrier is in the direction of the arrow besides position E. Immediately after each of these holding means passes the position E, an associated clamping finger 13 will swing into position as illustrated at positions F and G for holding the stem of the mushroom in the notch 12. The carrier 11 is rotated at constant speed and as each stem passes from position E to position F the root end portion RE, Fig. 6, of the stem ST will be caused to slide along an upper gauging face FA of a plate-like gauging member 14 for reacting upon such member which is rigidly connected with the severing means in the form of a disc knife 15 to cause this knife to descend with the gauging member under pressure received from the root end portion RE. As the mushroom is carried past the trailing edge TE of the gauging surface FA, the portion RE will be severed from the stem ST and allowed to drop into a receptacle (not shown). The upper end of the stem immediately above the turret 11 is then carried against the diagonal edge EG of a knife 17 to sever the button M from the stem and this button or head then progresses by its own momentum as illustrated in Fig. 7 across the knife for discharge onto a chute 18. Subsequent to removal of the button from the stem ST and as this stem is transported between positions G and H the associated clamping finger 13 will be caused to release the stem whereupon a stem discharge member 19 urged downwardly by a leaf spring 20 upon which it is mounted will drop into the notch 12 as illustrated at position H to forceably discharge the stem into a chute 21. The stem discharge member 19 is constructed of flexible material such as fabric-reinforced rubber so that the trailing edge 16 of the notch can distort the member 19 and cam it upwardly onto the upper face of the turret pursuant to movement of the notch beyond position H.

Referring now to the structural details of the machine or apparatus the base 22 thereof which is in the form of a bottomless box for housing a driving gear for the movable parts is supported upon legs 23, 24, and 25 having outwardly turned feet 26, 27, and 28; see Figs. 1 and 2. An upright sleeve bearing 29 is mounted on the upper side of a central portion of the base coaxially with an opening 31 in the upper horizontal wall 32 of such base. Sleeve bearing 29 has a flange 33 at its lower end secured to the base plate 22 by cap screws 34; see Figs. 1 and 4. A turret driving shaft 35 extending upwardly through the sleeve bearing 29 and journalled therein also extends through a hub 36 of the turret 11 to which it is secured by a diametrically extending rivet 37. A reduced diameter upper end portion 38 of the sleeve bearing 29 supports the lower end of the hub 36 to prevent downward movement of the turret and of the shaft 35. A hub 39 of a horizontal cam plate 41 is rigidly secured to the reduced sleeve bearing portion 38 by a set screw 42.

The turret 11 comprises a circular center plate 43 formed integrally with the hub 36. An annular recessed face 44 on the under side of the circular plate 43 provides a circular shoulder 45 which is received by a center hole of a thin annular plate 46 to serve as a pilot therefor, and this plate is held securely against the annular face 44 by a circle of bolts 47. A second annular plate, 48, of the same outside diameter as the plate 46 but having a much larger center opening 49 is mounted in coaxial relation with the plate 46 and slightly spaced therefrom vertically as illustrated in Fig. 4. Annular plate 48 is also secured to the circular plate 43 by the circle of bolts 47 and is held in spaced relation from the plate 46 by spacer collars 51 respectively surrounding the shanks of bolts 47. The notches 12, Fig. 7, are formed in the radially outer edges of the plates 46 and 48, the notch components in the plates 46 and 48 being identical in number and dimensions and being in respective registry axially of the plates. In Fig. 7 it can be seen that each of the notches 12 has one of the clamping fingers 13 associated therewith. These fingers have bearing holes 52, Figs. 4 and 7, adjacently to their inner ends. Said fingers are disposed flatwise between the annular plates 46 and 48 and their bearing holes 52 are journalled upon respective of the spacer collars 51 which are thicker axially of the bolts 47 than are the fingers 13 so a slight clearance is provided between the plates 46 and 48 to enable the fingers to be pivoted easily about the spacer collars. Each finger has a laterally-turned shank portion 53 from which there depends a bearing pin 54, Fig. 4, having a cam follower roller 55 journalled thereon. Apertured ears 56 are mounted on the bearing pins 54 above the rollers 55, and these ears are connected by springs 57 under tension with a multi-apertured ring 58 mounted upon the turret hub 36. Rollers 55 are at the same elevation as the cam plate 41 and are urged into contact with its edge profile 59 as illustrated in Fig. 7 by the springs 57. In Fig. 7 it is ascertainable that the cam profile 59 is circular and coaxial with the turret 11 excepting for a straight chordal profile portion 61 extending between profile points 62 and 63. While the cam follower rollers 55 are in position for engagement with any portion of the circular part of the cam profile the springs 57 will be distended and the associated fingers 13 will be pivoted out of blocking relation with their associated notches 12 as illustrated at positions H, A, B, C, D, and E, Fig. 7. When the cam follower rollers 55 are disposed opposedly to the chordal profile portion 61 their associated springs 57 will be unrestrained against pivoting these fingers clockwise (as viewed from above) for swinging them into position for retaining the stems of mushrooms within the notches 12 in the manner illustrated at positions F and G in Fig. 7.

Driving means for the turret 11 is illustrated in Figs. 1, 2, 4, and 6. Driving force is received from an electric motor MT which is mounted on a vertically depending extension 65 of the side wall of the machine base 22, Fig. 2, by cap screws 66. The armature shaft 67 of the motor MT carries a pulley 68 having a pair of axially spaced belt-receiving grooves 69 and 71. A belt 72 disposed in the groove 71 is given a quarter turn to facilitate it also being trained over a pulley 73 mounted upon one end of a horizontal shaft 74 journalled in a long bearing 75 formed in one side of a gear cover plate 76. The upper part of the pulley 73 is covered by an upwardly projecting cover plate 75a mounted over an opening 75b in the base plate 32. Cover plate 76 is mounted by means of cap screws 77, Fig. 1, on the under side of the base plate 32 for enclosing a worm gear 78 connected with the lower end of the shaft 35 by a pin 79. A worm pinion 81 constrained for rotation with the shaft 74 is meshed with the worm gear 78 as illustrated in Figs. 1 and 2 for driving the latter. The armature shaft 67 as viewed in Fig. 1 rotates counter-clockwise so as to be effective through the pulley 68, belt 72, pulley 73, shaft 74, pinion 81, gear 78, and the vertical shaft 35 for rotating the turret 11 counter-clockwise, Fig. 7.

The mushroom trimming means in the form of the disc knife 15, Figs. 4 and 6, is constrained for rotation with a shaft 85 which is journalled for both rotative and axial movement within a long bearing 86 mounted in a hole 87 in the base plate 32 and secured to this base plate by cap screws 88, Figs. 1 and 2, extending through a circular flange 89 formed integrally with the bearing. A mounting hub 91 arranged coaxially with the disc knife 15 and with which the knife is constrained for rotation is mounted on and constrained for rotation with an upper reduced-diameter end portion 93 of the shaft 85. Just below the shaft end portion 93 the inner race 94 of a ball bearing unit 95 is secured to the shaft 85. This inner race of the ball bearing unit is constrained against both rotative and axial movement relatively to the shaft 85. A shifter collar 96 is mounted rigidly upon the outer race 97 of the ball bearing unit and this collar 96 has diametrically oppositely extending trunnion bearing lugs 98, Figs. 4 and 6, respectively pivotally connected with one end of lever members 99 and 101 of a counter-balancing lever structure 102. Lever elements 99 and 101 extend along opposite sides of the vertical bearing 29 for the turret driving shaft 35 and to which they are pivotally connected by horizontally extending fulcrum pins 103 of which one is shown in Fig. 4. The opposite ends of the lever elements 99 and 101 mutually support a counter-weight W secured therebetween by pins 104. The mass of counter-weight W is sufficient to effectively bias the shaft 85 and the parts mounted thereon including the disc knife 15 upwardly in opposition to the gravitational force upon said shaft and the shaft-mounted parts. In Figs. 1, 2, and 4 it can be seen that the knife driving shaft 85 is driven from the motor pulley 68 by a belt 105 trained about this pulley and about a pulley 106 constrained for rotation with the lower end of the shaft 85.

The gauge element 14, Figs. 3, 4, 6, and 7, is adjustably mounted upon the vertically adjustable collar 96 by means of a flat slotted stem 107 projecting downwardly from the lower face of this member, a bolt 109 extending through the elongated slot 108 of such stem and a bracket 111 rigidly secured to the collar 96 by machine screws 112.

Support for the knife 17, Figs. 5, 6, and 7, and which slides along the upper face of the annular plate 46 for severing the buttons of the mushrooms from the stems ST is provided by a bracket 113 secured to the base 22 by bolts 114 and projecting upwardly. The upper end of the bracket 113 has a horizontal flange 115 upon which an end of the knife 17 rests and to which it is secured by small bolts 116. In Fig. 7 it can be seen that the cutting edge EG of the knife 17 extends diagonally of the direction of movement of the mushroom M at position F commencing to be severed by the knife. The heads or buttons MB which have been previously severed from the stems ST of mushrooms which had been held by the holding means at positions H and G can be seen progressing into the chute 18. This chute has upwardly extending side walls 117 and 118, and in Fig. 5 it can be seen that extensions 117a and 118a of the side walls project onto the upper face of the knife 17. A flange 117b projects horizontally from the lower edge of the side wall extensions 117a and is apertured for receiving the shanks of the bolts 116 as an expedient for retaining the chute 18 in position upon the machine.

The stem receiving chute 21 is mounted in the position illustrated in Figs. 5 and 7 by means of a bracket 121 riveted at 122 to a side wall 123 of the chute and having a horizontally-turned flange 124 at its lower end secured to the upper base plate 32 by machine screws 125.

An upstanding bracket 126 secured to the upper wall of the base 22 by screws 127 is provided with a horizontal flange 128 at its upper end for attachment of the stem ejector device spring arm 20 by means of rivets 129.

*Operation of apparatus*

When the apparatus is placed in operation by starting the electric motor MT the turret 11 will be caused to rotate at constant speed counter-clockwise as viewed from above in Fig. 7. Likewise the disc knife 15, Figs. 4 and 6, will be caused to rotate constantly by power received from the motor through the belt 105. Mushrooms can be fed by hand into the article holding means in the form of the turret notches 12 of this rotating turret while these holding means are at any of positions A to E. At this time, the clamping fingers 13 associated with such holding means will be pivoted into the release positions so there will be no difficulty in inserting the mushrooms with their stems projecting downwardly through the notches and the under side of their heads or buttons resting against the upper face of the annular plate 46; see Fig. 6. As each holding means advances the mushroom therein through that portion of the course extending between positions E and F the cam follower roller 55 mounted upon the arm 53 of the associated finger 13 will pass from the circular part of the cam profile 59 beyond the profile point 62 into registry with the chordal profile portion 61 permitting the associated spring 57 to pivot the finger into closing relation with the notch sides which converge radially of the turret. In this way, the mushroom stem ST will be clamped firmly within the holding means so as not to be dislodged therefrom upon subsequently encountering the trimming means knife 15 and the button severing knife 17.

Subsequent to the clamping fingers 13 being closed onto the stem of a mushroom as illustrated in Fig. 6 the associated holding means will arrive in opposed spaced relation with the gauge face FA of the gauge member 14. The root end portion RE will thus be caused to advance across a leading edge LE of the face FA and into sliding engagement with such face. In Fig. 6 it can be observed that the leading edge LE is disposed more distantly from the mushroom holding means in opposed spaced relation with the face FA than is trailing edge TE wherefore the face FA is tilted with respect to said holding means and with respect to the stem trimming means 15 lengthwise of the course through which the mushroom is caused to approach the severing or trimming means. As the mushroom M, Fig. 6, is transported toward the knife 15 the root end portion RE slides along the face FA thereby exerting a thrust force of sufficient magnitude between the mushroom holding means and the gauge member 14 to cause relative movement between said holding means and the knife axially of said knife. This relative movement occurs pursuant to the knife being moved downwardly by camming action of the root end portion against the face FA. Since the knife 15 is spaced less distantly from the mushroom holding means than the trailing edge TE, the length of the root end portion RE severed from the stem ST by the knife will be predetermined by the vertical distance between the knife and that section of the trailing edge TE over which the stem passes into engagement with the knife. The mass of counter-weight W is only sufficient to but slightly over-balance the gravitational force of the knife driving shaft 85 and the parts including the knife 15 mounted thereon. Thus the means including this counter-weight W for biasing the gauge plate 14 and the knife 15 into the uppermost position illustrated in Fig. 6 is predominatable over by the thrust force exertable by the stem ST between the mushroom holding means and the gauge face FA. Rotation of the shaft 85 in the bearing 86 prevents the existence of static friction between such shaft and bearing and thus facilitates endwise movement of the shaft within this bearing.

In Figs. 3, 4, and 6 it can be observed that the gauge face FA tilts transversely of the course through which the mushrooms are caused to approach the knife 15 as well as tilting lengthwise of such course. This transverse tilting of the gauge face FA causes the trailing edge TE thereof to tilt transversely of the course wherefore if the axial center of a mushroom stem ST is nearer to the end X of the edge TE than to the end Y thereof, the knife 15 will be depressed further and will therefore cut a shorter piece from the root end RE than if the axial center of the stem were nearer to the trailing edge end Y. The length of end portion RE trimmed from the lower end of the stem ST is gauged from that portion of the gauge face FA along the trailing edge TE and therefore the length of root portion trimmed from the stem will be a direct function of the distance of the stem from the trailing edge end X toward the end Y. This gauging feature of the apparatus is correlated with the angle of convergence of the edges 16—16a of notches 12 constituting the mushroom holding means. This is because mushrooms normally have discardable root end portions of a length proportional to the diameters of the stems. The large diameter stems are insertable less distantly into the notches 12 than are the small diameter stems wherefore the large diameter stems will be introduced to the knife 15 over a portion of the trailing edge TE nearer to the end Y than will the small diameter stems. Consequently the machine is designed for automatically gauging and trimming the correct length of root end portion from mushroom of random size and stem diameter irrespective of the order in which they are manually fed into the turret-mounted mushroom holding means.

Those root end portions which are severed from the stems by the knife 15 are permitted to drop and collect for discard. The turret operates at sufficient speed for the momentum of the buttons M severed from the stem by the knife edge EG to cause the severed buttons to slide across the knife 17 into the chute 18. The flange portion 18a extending upwardly from the knife 17 will change the course of the sliding heads or buttons and direct them onto the declining part of the chute 18.

After the root end portions and buttons have been cut from the stems as they pass from position F to position G in Fig. 7, the clamping fingers 13 will continue to hold the stems in the notches 12 until these stems are over a portion of the stem receiving chute 21 coincidentally with which the cam follower roller on the associated finger will approach the cam profile point 63 and pivot the finger counter-clockwise as viewed in Fig. 7 for releasing the stem and permitting it to be forceably ejected from the holding means (which includes the notches and the fingers) downwardly onto the chute 21 by the spring urged ejector head 19. The ejector head 19, as explained above, is formed of a bendable elastic substance such as fabric-reinforced rubber so that subsequently to entering each notch 12 it is engageable by the trailing edge 16 of such notch for being cammed upwardly onto the upper surface of the annular plate 46 which slides thereunder incident to carrying the succeeding notch into registry with the head.

Having described a single preferred embodiment of the invention with the view of clearly and concisely disclosing the same, we claim:

1. In a machine for processing trimmable articles having a stem, a root portion at an end of the stem and a head at the opposite end thereof; article holding means advanceable to transport an article held thereby along a linear course while disposing the principal axis of the article stem transversely of such course, means for advancing said holding means, root trimming means disposed contiguously to said course for trimming the root portion from the article as it is transported therepast, said holding means and said trimming means being relatively adjustable axially of the stem to determine the length of the root portion trimmed therefrom, and means sensitive to the diameter of said stem and to the combined length of the stem and root portion for determining the magnitude of such relative adjustment.

2. In a machine for processing trimmable articles having a stem, a root portion at an end of the stem and a head at the opposite end thereof; article holding means having an axis and advanceable to transport an article held thereby along a linear course transversely of said axis while holding the article with its stem in substantial parallelism with said holding means axis, means associated with said holding means to determine lateral spacing between the holding means axis and the axis of the stem therein according to the diameter of such stem, means for advancing the holding means, root trimming means disposed adjacently to said course for trimming the root portion from the article as it is transported therepast, said holding means and said trimming means being relatively adjustable axially of the holding means axis to determine the length of root portion trimmed from the stem, and means sensitive to the length of said stem and also to said lateral spacing of the stem and holding means axes for determining the magnitude of said relative adjustment of the trimming means and holding means.

3. In a machine for processing trimmable articles having a stem, a root portion at an end of the stem and a head at the opposite end thereof; article holding means advanceable to transport an article held thereby lengthwise of a course while disposing the principal axis of the article stem transversely of such course, means for advancing said holding means, trimming means disposed adjacently to the course and operable to sever the root portion from the stem as the article is carried past said trimming means, said holding means and said trimming means being relatively movable lengthwise of an article stem held by the holding means, a gauge member constrained for movement with the trimming means and having a gauging face extending lengthwise of said course while diverging therefrom in the direction from which the articles approach to facilitate the root portion having a camming action upon said face for relatively moving the trimming means and article holding means lengthwise of the article stem to separate them as the article approaches the trimming means, said member being tilted transversely of said course to modify the amount of such separation of the holding means and trimming means in accordance with the lateral position of the article stem transversely of the course, and gauge means associated with the holding means and against which the article stem is retainable for determining such lateral position in accordance with the diameter of the stem.

4. In a machine for processing trimmable articles having a stem, a root portion at an end of the stem and a head at the opposite end thereof; trimming means adapted to trim the root portion of an article from the stem of an article transported therepast, article holding means advanceable past said trimming means while transporting an article held thereby past the means as aforesaid, said article holding means being adapted to hold an article in position for the stem and root portion thereof to project transversely of said course toward the trimming means while said holding means is in alignment with the trimming means transversely of the course, said article holding means and said trimming means being relatively movable to determine the distance therebetween lengthwise of the stem of an article being trimmed and to thereby determine the length of the root portion severed from the stem, a gauge member constrained for movement with the trimming means and having a gauge face intersecting and arranged diagonally of the line of approach of a root portion approaching the severing means, said gauge member being thus engageable by an approaching root portion to cause predetermined spacing of the holding means and severing means during the severing operation, said gauge face being also tilted transversely of the line of approach of the root portion to determine the spacing of the severing means and holding means according to the lateral disposition of the root portion transversely of said line of approach, and gauge means associated with said holding means and determining said lateral disposition of the stem and root portion in accordance with the diameter of the stem.

5. In a machine for processing articles having a stem with a trimmable root end portion, stem trimming means for removing such root end portion, a gauge member assembled with and constrained against movement relatively to said trimming means, said gauge member being provided with a gauge face having a leading edge and a trailing edge, article holding means advanceable across said gauge face in opposed spaced relation thereto successively across the leading and trailing edges in the order named, said holding means being operable for holding an article to project the root end portion thereof toward and into engagement with the opposed gauge face, means mounting the article holding means and the trimming means for relative movement for changing the spacing of the opposed article holding means and gauge face to accommodate the passage of different length article stems therebetween, means providing for biasing the opposed holding means and gauge member in the direction of relative movement to diminish their opposed spacing with a force dominatable by thrust force exertable by an article stem interposed between the holding means and the gauge face, the gauge face being tilted with respect to the holding means so the leading edge is spaced from the opposed holding means more distantly than the trailing edge for adapting the interposed stem to further space the holding means and gauge member as the stem approaches the trailing edge, the trimming means being disposed adjacently to said trailing edge and spaced therefrom toward the holding means for trimming the root end portion of predetermined length from the stem means associated with said holding means for adjusting the articles transversely of their stems in one direction lengthwise of said trailing edge as a direct function of the diameter of such stems, and the gauge member having its face tilted divergingly from the trimming means in the direction of such transverse adjustment to increase the length of root portion severed from the stem in accordance with the lateral adjustment thereof.

6. A mushroom trimming machine comprising a rotatable carrier having an annular portion with opposite faces and bordered by a perimetric edge, mushroom holding means including cut-out sections in said annular portion, said cut-out sections being spaced apart linearly of said edge and each section having opposed sides diverging toward said edge, each of said holding means being adapted to hold a mushroom with its head adjacently to one of said faces while its stem projects through the cut-out section in engagement with the diverging sides thereof to cause such stem to have a contiguity with said perimetric edge correlated with the diameter of such stem, means for rotating the carrier, stem trimming means disposed substantially parallel with and in opposed spaced relation to a part of the other face of the annular carrier portion to sever root end portions from the mushroom stems pursuant to their being transported thereto through a line of approach by the rotating carrier, means mounting the trimming means for adjustment perpendicularly to said other face part, a gauge member constrained for such adjustment with the trimming means and having a gauge face also in opposed relation with said face part and disposed in angular intersecting relation with said line of approach for being brushable against by the root ends of the stems to adjust the spacing of the gauge member and the trimming means from said other carrier face as the stems approach the trimming means; and said gauge face and said face part diverging as they extend generally toward said perimetric edge of the carrier.

7. A mushroom trimming machine comprising a carrier rotatable about a vertical axis and having upper and lower sides bordered by a perimetric edge, a plurality of mushroom holding means including respective cut-out sections in the carrier adjacently to said edge and spaced apart linearly thereof, each cut-out section having opposed sides diverging toward the carrier edge, each holding means being adapted to hold a mushroom with its head contiguously to the upper side of the carrier while the stem projects downwardly through the cut-out section in engagement with the diverging sides thereof to cause the stem to have a contiguity with the perimetric edge correlated with the diameter of such stem, means for rotating the carrier, stem trimming means having a horizontal stem-severing edge disposed in opposed spaced relation to the lower side of the carrier in position to be successively passed over by the cut-out sections and to sever lower end portions from the stems of mushrooms held thereby pursuant to their being transported thereto through a line of approach by the rotating carrier, means mounting the stem trimming means for vertical adjustment to change the spacing thereof from the lower ends of the transported mushrooms, a gauge member associated with the trimming means and also vertically movable to effect such adjustment of the trimming means, said gauge member having a gauge face also in opposed spaced relation with the lower side of the carrier though more distantly therefrom than the trimming means edge and sloping upwardly theretoward in intersecting relation with said line of approach so as to be successively brushable against by the root ends of the transported mushroom stems to adjust the spacing of the gauge member and trimming means cutting edge from the carrier, and said gauge member face sloping downwardly radially of the carrier to cause the stems of larger diameter stems which are held more distantly radially outwardly of the carrier to intersect the cutting edge at a section of higher elevation from their lower ends.

8. A mushroom trimming machine comprising a carrier rotatable about a vertical axis and having upper and lower sides bordered by a perimetric edge, a plurality of mushroom holding means including respective cut-out sections in the carrier adjacently to said edge and spaced apart linearly thereof, each holding means being adapted to releasably hold a mushroom with its head contiguously to the upper side of the carrier while the stem projects downwardly through the cut-out section, said machine including a stem-trimming station beneath the carrier adjacently to said edge thereof, a head-removing station above the carrier and also adjacently to said edge, and a stem-releasing station, means for rotating said carrier to successively sweep said holding means past said stations, and the stem-releasing station being disposed so as to be passed by the holding means subsequently to their passing the other stations during rotation of the carrier, a horizontally extending knife at the stem-trimming station for intersecting and trimming the root end portions from the stems as they move therepast, a flat horizontal knife disposed substantially flatwise against the upper side of the carrier at the head-removing station to slice the heads from the mushrooms moving therepast and facilitate precipitation of the sliced-off head thereacross, a chute disposed for receiving the precipitated heads, and means for releasing the de-rooted and decapitated stems from the holding means as they traverse the stem-releasing station comprising an ejector head of pliable resilient material, and spring means yieldably pressing said head against the upper side of the carrier and into the cut-out sections as they are passed thereunder by the rotating carrier.

9. In a stem trimming machine, a bearing, a shaft journalled in said bearing for both rotational and endwise movement, a stem-trimming disc knife mounted coaxially with said shaft and constrained for rotation therewith, and gauge means operably connected with said shaft for adjusting the same endwise during rotation thereof, said gauge means having a gauge face slidably engageable by an end of stems approaching the knife, said gauge face being tilted angularly to the shaft and knife axes, to slope from the knife in one radial direction therefrom and also being tilted angularly to such axes to slope from the knife in a radial direction therefrom which is 90° from the first radial direction.

10. The combination set forth in claim 9, wherein there is means yieldably biasing the knife in one axial direction, and said gauge means being operable responsively to pressure on the gauge face thereof to move the knife in the opposite axial direction against the force of the biasing means.

11. The combination set forth in claim 9, wherein the disc knife is also constrained for axial movement with the shaft, wherein there is means yieldably biasing the shaft and hence the knife to one range limit of reversible axial movement, and said gauge means being operable responsively to pressure on the gauge face to move the shaft and knife axially away from said range limit in opposition to the force of the biasing means.

12. In a machine for trimming root end portions from ends of stems of trimmable articles, a knife having a cutting edge, a carrier including holding means for respective articles and operable to successively carry such articles through a path approaching the knife while holding the stems transversely of the path and of the knife cutting edge and thence carry the articles past the cutting edge to trim the root end portions therefrom, a gauge structure having a gauge surface beside the path in opposed relation to the root end portions axially of the stems and for engagement by the ends of the stems as they approach the knife, the gauge surface converging upon the path as it leads toward the knife to gauge the cutting edge thereof with respect to the ends of the stems lengthwise of such stems, the gauge surface also being tilted to diverge relatively to the knife edge toward a side of said path laterally of the stems to gauge the knife edge farther from such stem ends according to the proximity of the stems with such side of the path, and the carrier holding means having stem-engaging edges diverging toward said side of the path and being thus operable to dispose stems held thereagainst in proximity with such side of the path in accordance with their diameter.

JOE R. URSCHEL.
LEWIS E. WALTON.

(References on following page)

REFERENCES CITED

The following references are of record in the file of this patent:

UNITED STATES PATENTS

| Number | Name | Date |
|---|---|---|
| 1,326,905 | Birch | Jan. 6, 1920 |
| 1,347,385 | Kirno | July 20, 1920 |
| 1,825,629 | Floyd | Sept. 29, 1931 |
| 1,890,676 | Fox | Dec. 13, 1932 |
| 1,906,438 | Vetch | May 2, 1933 |
| 2,047,006 | Crawford | July 7, 1936 |
| 2,062,739 | Canaday | Dec. 1, 1936 |
| 2,178,920 | Savery | Nov. 7, 1939 |
| 2,192,247 | Urschel | Mar. 5, 1940 |
| 2,289,015 | Jackson | July 7, 1942 |
| 2,494,914 | Urschel | Jan. 17, 1950 |